United States Patent [19]

McDonald et al.

[11] Patent Number: 5,454,163

[45] Date of Patent: Oct. 3, 1995

[54] METHOD OF MAKING A FORAMINOUS ARTICLE

[76] Inventors: William K. McDonald, 100 Scenic Dr., Madison, Ala. 35758; Philip M. O'Larey, 1088 Umatilla Ct. SW., Albany, Oreg. 97321

[21] Appl. No.: 121,647

[22] Filed: Sep. 16, 1993

[51] Int. Cl.⁶ ................................................ B23P 15/00
[52] U.S. Cl. .................................. 29/840.32; 29/890.53; 29/890.54
[58] Field of Search ................................ 29/549, 890.54, 29/890.32, 890.35, 890.45, 890.53, 557, 902; 165/907, 133; 148/11.5

[56] References Cited

U.S. PATENT DOCUMENTS

| | | |
|---|---|---|
| 3,268,373 | 8/1966 | Reynolds . |
| 3,506,940 | 4/1970 | Corenzwit et al. . |
| 3,511,720 | 5/1970 | Raymond . |
| 3,715,569 | 11/1975 | Knep, Jr. et al. ............... 198/133 |
| 4,196,504 | 4/1980 | Eastman ...................... 29/890.32 |
| 4,262,412 | 4/1981 | McDonald ..................... 174/126 S |
| 4,354,355 | 10/1982 | Lawliss ......................... 165/133 |
| 4,372,377 | 2/1983 | Morris .......................... 29/890.32 |
| 4,414,428 | 11/1983 | McDonald ..................... 174/126 S |
| 4,879,185 | 11/1989 | Masuda et al. ................ 165/133 |
| 4,929,414 | 5/1990 | Leonard et al. ............... 29/890.32 |
| 5,034,857 | 7/1991 | Wong .............................. 29/599 |
| 5,077,103 | 12/1991 | Wagner et al. ................ 165/133 |
| 5,101,894 | 4/1992 | Hendricks ..................... 165/164 |
| 5,116,429 | 5/1992 | Wong .............................. 29/599 |
| 5,182,176 | 1/1993 | Wong .............................. 29/599 |

FOREIGN PATENT DOCUMENTS

| | | |
|---|---|---|
| 2127022 | 6/1973 | Germany . |
| 46-20459 | 6/1971 | Japan ........................... 148/133 |
| 50-09395 | 4/1975 | Japan . |
| 9012404 | 5/1979 | Japan . |
| 0015108 | 4/1980 | Japan . |
| 0044876 | 11/1980 | Japan . |
| 9105215 | 6/1984 | Japan . |
| 9111204 | 6/1984 | Japan . |
| 0108194 | 5/1988 | Japan . |

*Primary Examiner*—Irene Cuda
*Attorney, Agent, or Firm*—Shoemaker and Mattare, Ltd.

[57] ABSTRACT

A method of making a porous plug suitable for use as a phase separator, heat exchanger tube, wherein very small uniform holes are produced in a matrix by placing a first material in a matrix of a second material to form a bundle or billet comprising said materials, reducing the cross-section of the bundle or billet by drawing or extrusion to form a reduced cross-section rod, and then etching away one of the materials to leave a matrix with very small uniform holes therein. The reduced rod may be bundled with other similarly reduced rods to form a bundle which is again drawn to further reduce the cross-section thereof.

6 Claims, 2 Drawing Sheets

METHOD OF MAKING A FORAMINOUS ARTICLE

FIELD OF THE INVENTION

This invention relates to manufactured metallic articles of porous construction. More particularly, the invention relates to foraminous metal articles or porous metal plugs useful as phase separators, heat exchanger tubes and the like, and to the method of making them.

DESCRIPTION OF THE PRIOR ART

Foraminous articles useful as phase separation filters (e.g. superfluid Helium filters) and heat exchanger tubes have conventionally been manufactured by sintering copper powder. Foraminous articles manufactured in this way exhibit poor radial and axial heat transfer characteristics due to the small surface area of inter-particle bonds, and have non-uniform hole size, non-uniform hole cross-sections and nonlinear fluid paths. The prior art has sought to improve the efficiency and effectiveness of such articles by providing means of enhancing the heat transfer characteristics, and/or the uniformity of hole cross-sections and size and the linearity of flow passages, in order to minimize fluid turbulence in a simple and relatively inexpensive way without success.

In applicants prior U.S. Pat. Nos. 4,262,412 and 4,414,428, means are described for manufacturing multi-filament wires or rods especially suitable for use as superconductors. These patents essentially describe a construction process in which the composite is formed by reducing a lamina of two metals, one of which is in expanded form. The laminated metals are rolled to form a cylindrical billet, resulting in a method and structure commonly referred to as a "modified jelly roll". The composite can be encased in a copper matrix and fabricated to produce a superconductor. Alloys contemplated for producing superconductors are $Nb_3Sn$, $Nb_3Ga$, $NB_3Ge$, $Nb_3Si$, Nb-Ti, $V_3Si$, $V_3Ga$, $V_3Sn$, $V_3Al$ and $V_3Ge$ laminated on bronze, aluminum, copper or tantalum, or combinations thereof.

Applicant has discovered a unique method of making a foraminous material, in which the processes described in his patents noted above can be used. The foraminous material manufactured in accordance with the invention has uniformly shaped and sized holes linearly arranged in a matrix having superior heat transfer qualities.

OBJECTS OF THE INVENTION

Accordingly, it is an object of this invention to provide a foraminous metal material comprising a matrix having uniformly shaped and sized holes therein.

Another object of the invention is to provide a porous metal plug suitable for use as a gas/liquid phase separator, heat exchange tube and the like, which has superior heat transfer characteristics.

A further object of the invention is to provide a method of making a foraminous article, in which preferential etching is used to remove one material from a matrix of a second material, leaving holes having uniform sizes and shapes throughout the matrix.

Still another object of the invention is to provide a method of making a foraminous metal article, in which a plurality of filaments of a first material are distributed throughout a matrix of a second material to form a rod or wire, and the rod or wire is then cut to appropriate lengths, after which the filaments are etched away to leave holes or voids in the matrix.

SUMMARY OF THE INVENTION

In accordance with the present invention, a multi-filamentary metal rod or wire comprised of a matrix of one material and a plurality of substantially uniformly distributed filaments of a second material is preferentially etched to remove the filaments, thereby producing a foraminous material having a matrix with a plurality of substantially uniformly shaped and sized voids or holes distributed linearly throughout. The resulting material is especially suitable in the manufacture of porous plugs, gas/liquid phase separators and heat exchanger tubes.

Existing conventional multi-filamentary rod processes and the modified jelly roll process as described in applicant's previously noted patents can be advantageously used in the method of the invention. The matrix of the porous plug may be any number of alloys or elements as long as the filaments can be preferentially etched. For instance, the matrix may comprise various metals such as copper, molybdenum or niobium and the like. In the first two instances, the filaments could consist of niobium, niobium-titanium alloy, zirconium, or hafnium, and etchants such as hydrofluoric acid and the like could be used to etch away the filaments. In the latter instance, the filaments could comprise, for example, copper or vanadium, and nitric acid, for example, could be used to etch the filaments.

Thus, in practicing the invention, either the modified jelly roll approach or the basic rod process approach to manufacturing multi-filamentary superconductor rod and wire can be followed to produce a metal rod or wire with a copper matrix and niobium-titanium alloy filaments. The rod or wire is then cut into appropriate lengths, polished on the ends where filaments are exposed, and immersed in a suitable acid solution to preferentially etch the filaments, leaving a copper matrix with voids or holes where the filaments were previously located. The resulting matrix has unexpectedly superior radial and axial thermal conductivity compared to the sintered product, and also has uniformly shaped and sized holes distributed generally linearly throughout.

Such articles are useful, e.g., in cryocoolers and gas/liquid phase separators, especially in space applications under zero gravity conditions. However, it will become more readily apparent to those skilled in the art that the advantages shown by the present invention and the accompanying drawings may find utility in still other areas where such characteristics are needed.

BRIEF DESCRIPTION OF THE DRAWINGS

The foregoing and still other objects and advantages of the invention will become apparent from the following detailed description and accompanying drawings, in which like reference characters designate like parts throughout the several views, and wherein.

DETAILED DESCRIPTION OF THE PREFERRED EMBODIMENTS

Figure 1:
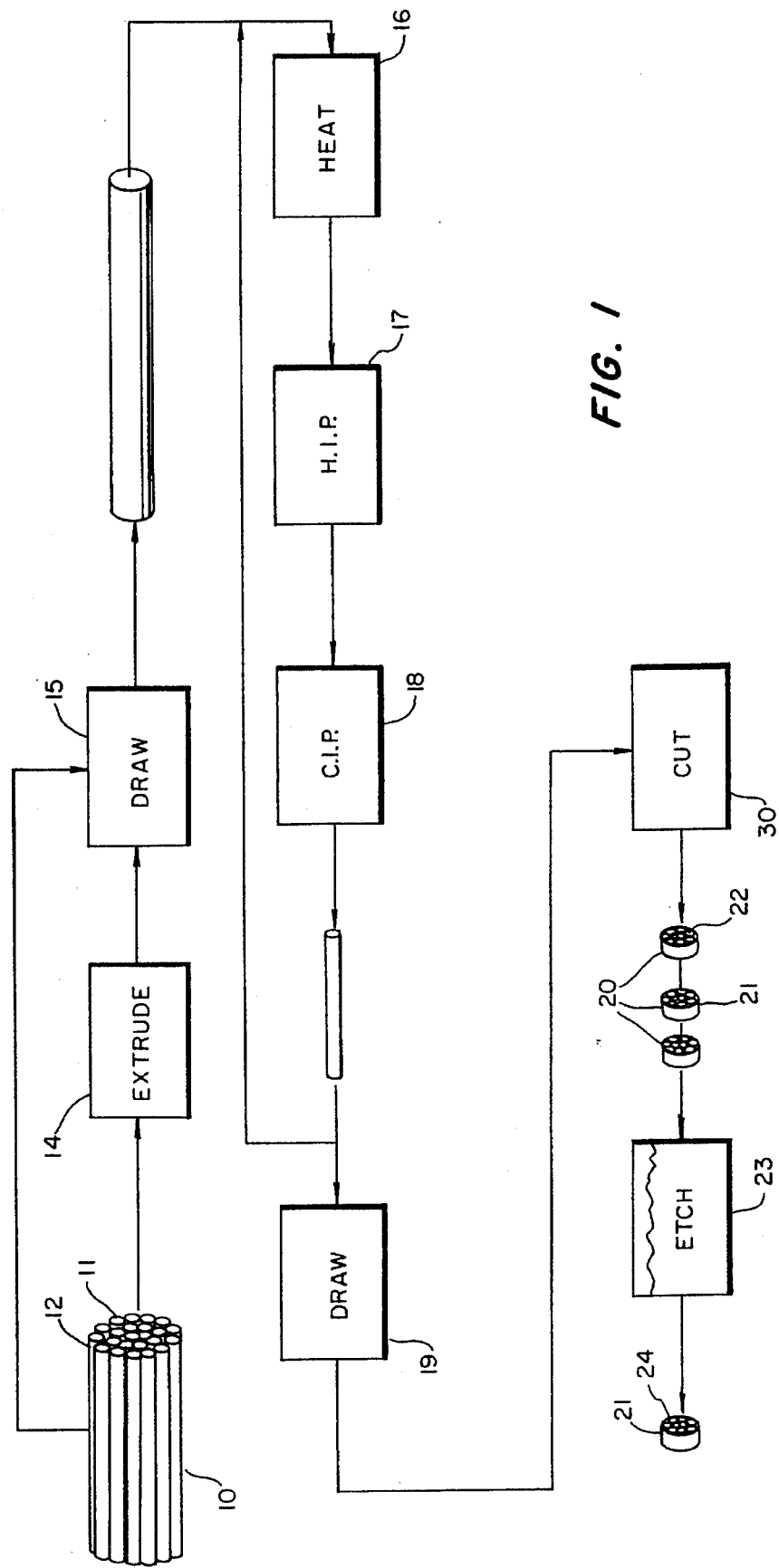
FIG. 1 is a schematic diagram of one process which may be used in the manufacture of the foraminous article of the invention.

Referring more particularly to the drawings, the foraminous article of the invention is manufactured by the process illustrated in FIG. 1. In this figure, Ni—Ti alloy rods 10 are stacked with copper 11 to form a multi-filamentary billet 12 for extrusion, or rod for drawing. The composite billet or rod is then extruded and/or drawn, as appropriate, at one or both of stations 14 and 15, and subjected to heat treatment or annealing at station 16 over a period of from one minute to one hundred sixty hours at a temperature of from 200° C. to 500° C., hot isostatic pressing (HIPing) at station 17 over a period of from one second to ten hours at a temperature of from 200° C. to 700° at a pressure of from 1,000 to 80,000 psi, and/or cold isostatic pressing (CIPing) at station 18 over a period of from one second to one hour at a pressure of from 1,000 to 150,000 psi. The rods or billets may be recycled through these heat treatment, annealing, HIPing and CIPing steps as many times as necessary or desirable to optimize the bonding of the constituents and the density of the composite.

Figure 2:
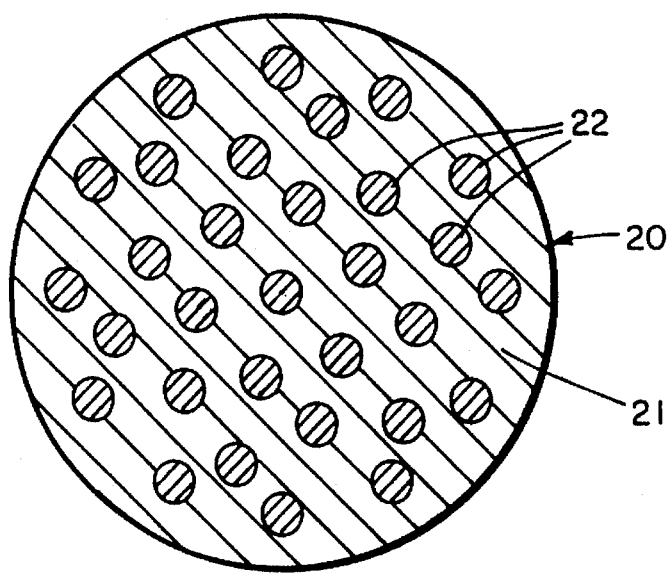
FIG. 2 is an enlarged, somewhat schematic transverse sectional view of a multi-filamentary rod or wire used in the manufacture of the invention, shown prior to etching.

One or more final drawing steps are then performed at 19 to reduce the composite rod or billet to a desired rod or wire size, and the rod or wire is then cut at 30 into appropriate lengths 20, one-thirty second to one-half inch long, for example, and the ends polished. The cut lengths 20 comprise a matrix 21 having a plurality of small, uniformly shaped, sized and spaced filaments 22 extending therethrough. See FIG. 2.

Figure 3:
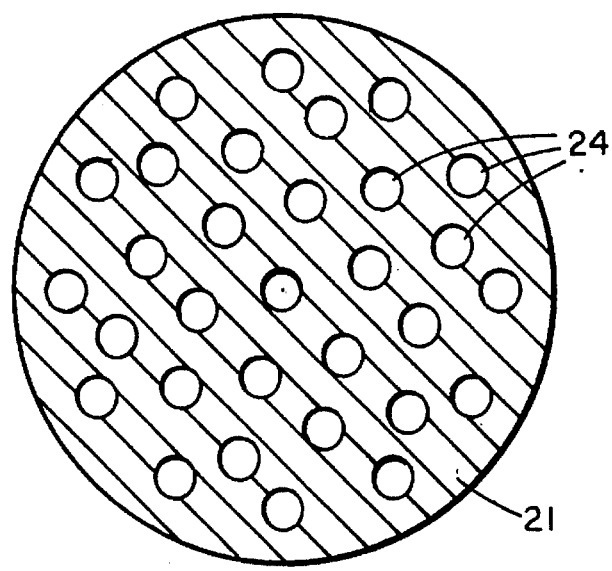
FIG. 3 is a view similar to FIG. 2, showing the article after etching to remove the filaments.

The cut sections or lengths 20 are immersed in an acid solution 23, preferably hydrofluoric acid, to etch away the Nb-Ti alloy filaments 22 in the composite, leaving a copper matrix 21 with uniformly shaped and sized holes 24 extending linearly therethrough. See FIG. 3. The number and dimensions of the holes may be varied as desired, by altering the various assembly, extruding and/or drawing steps during reduction of the composite. In one example produced in accordance with the invention the holes had a diameter of about 5 microns.

In another embodiment of this invention, the multi-filamentary rods, after being cut to appropriate lengths, are further bundled or stacked at least one time more with other rods similarly produced and cut, then drawn and reduced in size prior to polishing the ends and etching to remove the filaments such as to produce the foraminous plug.

While a particular process for forming the multi-filamentary rods or billets has been described, it should be noted that any conventional process for making multi-filamentary rods may be used. For instance, the processes disclosed in applicant's prior U.S. Pat. Nos. 4,262,412 and 4,414,428 may be followed in producing the rods or wires for preferential etching to remove the multi-filamentary billet or rod produced in accordance with the method disclosed in applicant copending application Ser. No. 311,732, filed Feb. 17, 1989, which is incorporated herein by reference in its entirety, may be used in practicing the present invention.

Although the invention has been described with reference to particular embodiments it is to be understood that these embodiments are merely illustrative of the application of the principles of the invention. Numerous modifications may be made therein and other arrangements may be devised without departing from the spirit and scope of the invention.

We claim:

1. The method of making a foraminous article suitable for use as a gas/liquid phase separator, heat exchanger tube, porous plug or the like, comprising the steps of:

forming a rod or wire having a matrix of one material and a plurality of filaments of a second material distributed throughout the matrix;

preferentially etching away the filaments to form a porous matrix having a substantially uniformly sized and shaped holes distributed throughout;

wherein the rod or wire of matrix material having multiple filaments therein is subjected to heat treatment, the heat treatment being over a period of from one minute to one hundred sixty hours at a temperature of from 200° C. to 500° C., after which the billet is subjected to hot isostatic pressing over a period of from one second to ten hours at a temperature of from 200° C. to 700° C. at a pressure of from 1,000 to 80,000 psi.

2. The method as claimed in claim 1, wherein the matrix comprises a material selected from the group consisting of copper, molybdenum and niobium; and the filaments comprise a material selected from the group consisting of niobium, niobium-titanium alloy, zirconium, hafnium and niobium base.

3. The method as claimed in claim 2, wherein rods of filamentary material are drawn, extruded or otherwise formed to produce reduced diameter rods, said reduced diameter rods are then stacked with the matrix material to form a bundle of rods and matrix material, and the bundle is then reduced in cross-section by drawing or extruding or the like to produce a matrix having very fine filaments therein, whereby subsequent etching of the filaments form the matrix produces a porous member with very fine hole therein.

4. The method as claimed in claim 3, wherein said reduced bundle is stacked with like reduced bundles and again reduced in cross-section by drawing or extruding and the like to produce a matrix having very fine filaments therein.

5. The method as claimed in claim 1, wherein the billet is also subjected to cold isostatic pressing over a period of from one second to one hour at a pressure of from 1,000 to 150,000 psi.

6. The method as claimed in claim 5, wherein the billets are recycled through the heat treatment, annealing, hot isostatic pressing and cold isostatic pressing as many times as desired or necessary to optimize the bonding of the constituents and the density of the composite.

* * * * *